United States Patent
Vanier et al.

(10) Patent No.: US 9,022,648 B2
(45) Date of Patent: May 5, 2015

(54) TEMPERATURE SENSITIVE COMPOSITE FOR PHOTONIC CRYSTALS

(75) Inventors: Noel R. Vanier, Wexford, PA (US);
Eldon L. Decker, Gibsonia, PA (US);
Stuart D. Hellring, Pittsburgh, PA (US);
Xiangling Xu, Pittsburgh, PA (US);
Sean Purdy, Cincinnati, OH (US);
Gregory J. McCollum, Gibsonia, PA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 418 days.

(21) Appl. No.: 12/944,190

(22) Filed: Nov. 11, 2010

(65) Prior Publication Data

US 2012/0120984 A1 May 17, 2012

(51) Int. Cl.
*G01K 11/20* (2006.01)
*G01K 11/16* (2006.01)
*B82Y 40/00* (2011.01)
*B82Y 20/00* (2011.01)

(52) U.S. Cl.
CPC . *B82Y 40/00* (2013.01); *B82Y 20/00* (2013.01)

(58) Field of Classification Search
USPC ......... 374/161, 178, 130–132, 141, 120, 159, 374/162; 427/162
See application file for complete search history.

(56) References Cited

U.S. PATENT DOCUMENTS

| | | | |
|---|---|---|---|
| 4,833,172 A | 5/1989 | Schwarz et al. | |
| 5,122,905 A | 6/1992 | Wheatley et al. | |
| 5,266,238 A | 11/1993 | Haacke | |
| 5,281,370 A | 1/1994 | Asher et al. | |
| 5,330,685 A | 7/1994 | Panzer | |
| 5,527,386 A | 6/1996 | Statz | |
| 5,624,731 A | 4/1997 | Desjardins | |
| 5,711,884 A | 1/1998 | Asher et al. | |
| 5,783,120 A | 7/1998 | Ouderkirk et al. | |
| 5,824,733 A | 10/1998 | Dobert et al. | |
| 5,854,078 A | 12/1998 | Asher et al. | |
| 5,932,309 A | 8/1999 | Smith et al. | |
| 6,114,023 A | 9/2000 | Schwarz et al. | |
| 6,165,389 A | 12/2000 | Asher | |
| 6,187,599 B1 | 2/2001 | Asher et al. | |
| 6,299,979 B1 | 10/2001 | Neubauer et al. | |
| 6,337,131 B1 | 1/2002 | Rupaner et al. | |

(Continued)

FOREIGN PATENT DOCUMENTS

| | | |
|---|---|---|
| CN | 101870866 | 10/2010 |
| JP | 200446224 A | 2/2004 |

(Continued)

OTHER PUBLICATIONS

Kubo, Shoichi et al., "Tunable Photonic Band Gap Crystals Based on a Liquid Crystal-Infiltrated Inverse Opal Structure", Journal of the American Chemical Society; Jul. 7, 2004; pp. 8314-8319, vol. 126, No. 26, American Chemical Society.

(Continued)

*Primary Examiner* — Gail Kaplan Verbitsky
(74) *Attorney, Agent, or Firm* — Julie W. Meder

(57) ABSTRACT

A composite photonic crystal comprising an inverse opal structure defining an ordered array of voids with a filler composition received within the voids. A property of the filler composition changes in response to a stimulus, such as a temperature change, thereby changing the band gap of radiation that is reflected by the composite photonic crystal.

16 Claims, 1 Drawing Sheet

(56) References Cited

U.S. PATENT DOCUMENTS

| | | | |
|---|---|---|---|
| 6,753,191 | B2 | 6/2004 | Asher et al. |
| 6,782,115 | B2 | 8/2004 | Decker et al. |
| 6,893,502 | B2* | 5/2005 | Papadimitrakopoulos et al. ............................ 117/92 |
| 6,894,086 | B2 | 5/2005 | Munro et al. |
| 6,991,847 | B2* | 1/2006 | Padmanabhan et al. ... 428/316.6 |
| 7,008,567 | B2 | 3/2006 | Foulger et al. |
| 7,217,746 | B2 | 5/2007 | Munro et al. |
| 7,233,200 | B2* | 6/2007 | Yamada .......................... 330/141 |
| 7,291,389 | B1 | 11/2007 | Bitler et al. |
| 7,373,073 | B2* | 5/2008 | Kamp et al. ................... 385/141 |
| 7,604,850 | B2* | 10/2009 | Kumar ............................ 428/1.1 |
| 7,760,424 | B2* | 7/2010 | Takeuchi et al. ............... 359/359 |
| 7,923,068 | B2* | 4/2011 | Dickey et al. ................ 427/248.1 |
| 8,569,696 | B2* | 10/2013 | Barker et al. ................. 250/338.1 |
| 8,641,933 | B2* | 2/2014 | Purdy et al. .................... 252/586 |
| 8,676,016 | B2* | 3/2014 | Arsenault et al. .............. 385/129 |
| 8,678,016 | B2* | 3/2014 | Snaidr et al. ................... 131/365 |
| 2002/0054680 | A1 | 5/2002 | Huang et al. |
| 2002/0074537 | A1 | 6/2002 | John et al. |
| 2002/0143073 | A1 | 10/2002 | Jiang et al. |
| 2003/0103721 | A1* | 6/2003 | Padmanabhan et al. ........ 385/24 |
| 2004/0118339 | A1* | 6/2004 | Papadimitrakopoulos et al. ............................ 117/84 |
| 2004/0253443 | A1 | 12/2004 | Anselmann et al. |
| 2005/0166837 | A1* | 8/2005 | Marshall ........................ 117/200 |
| 2005/0228072 | A1 | 10/2005 | Winkler et al. |
| 2006/0054780 | A1* | 3/2006 | Garrood et al. ................ 250/208.1 |
| 2006/0137601 | A1 | 6/2006 | Miguez et al. |
| 2006/0191442 | A1 | 8/2006 | He et al. |
| 2006/0235086 | A1 | 10/2006 | Maskaly et al. |
| 2006/0254315 | A1 | 11/2006 | Winkler et al. |
| 2007/0100026 | A1 | 5/2007 | Munro et al. |
| 2007/0165903 | A1 | 7/2007 | Munro et al. |
| 2007/0178307 | A1* | 8/2007 | Winkler et al. ................ 428/403 |
| 2008/0246580 | A1* | 10/2008 | Braun et al. ..................... 338/20 |
| 2009/0034051 | A1* | 2/2009 | Arsenault et al. .............. 359/290 |
| 2009/0038512 | A1 | 2/2009 | Xu et al. |
| 2009/0155545 | A1 | 6/2009 | Purdy et al. |
| 2009/0169735 | A1* | 7/2009 | Park et al. ...................... 427/162 |
| 2010/0045027 | A1 | 2/2010 | Whiteman |
| 2010/0103414 | A1 | 4/2010 | Okamoto et al. |
| 2011/0068676 | A1* | 3/2011 | Jeon et al. ...................... 313/483 |
| 2011/0169648 | A1* | 7/2011 | Dutta et al. .................... 340/603 |
| 2012/0044970 | A1* | 2/2012 | Arsenault ....................... 374/159 |
| 2012/0120984 | A1* | 5/2012 | Vanier et al. ................... 374/161 |
| 2012/0139230 | A1* | 6/2012 | Whiteman et al. .............. 283/72 |
| 2013/0001940 | A1* | 1/2013 | Arsenault et al. ................ 283/67 |
| 2013/0075676 | A1* | 3/2013 | Purdy et al. .................... 252/586 |

FOREIGN PATENT DOCUMENTS

| | | |
|---|---|---|
| JP | 200531172 A | 2/2005 |
| JP | 2006323231 A | 11/2006 |
| RU | 2008124859 | 12/2009 |
| WO | 2004063432 A1 | 7/2004 |
| WO | 2004098793 | 11/2004 |
| WO | 2006069702 | 7/2006 |
| WO | 2008047514 A1 | 4/2008 |
| WO | 2008098339 A1 | 8/2008 |
| WO | 2009143625 A1 | 12/2009 |
| WO | WO 2010009558 A1 * | 1/2010 |
| WO | WO 2010068279 A1 * | 6/2010 |

OTHER PUBLICATIONS

Endo, Tatsuro et al., "Colorimetric detection of volatile organic compounds using a colloidal crystal-based chemical sensor for environmental applications," Sensors and Actuators B, 2007, pp. 589-595, vol. 125, Elsevier B.V.

Nagao, Daisuke et al., "Preparation of highly monodisperse poly(methyl methacrylate) particles incorporating fluorescent rhodamine 6G for colloidal crystals," Journal of Colloid and Interface Science, 2006, pp. 232-237, vol. 298, Elsevier Inc.

Fudouzi, Hiroshi et al., "Colloidal Crystals with Tunable Colors and Their Use as Photonic Papers," Langmuir, 2003, pp. 9653-9660, vol. 19, American Chemical Society, USA.

Rao, A. Venkateswara et al., "Comparative studies of the physical and hydrophobic properties of TEOS based silica aerogels using different co-precursors," Science and Technology of Advanced Materials, 2003, pp. 509-515, vol. 4.

Hotta, Yuji, "Coated polystyrene particles as templates for ordered macroporous silica structures with controlled wall thickness," J. Mater. Chem., 2003, pp. 496-501, vol. 13.

Xu, Xiangling et al., "Synthesis and Utilization of Monodisperse Superparamagnetic Colloidal Particles for Magnetically Controllable Photonic Crystals," Chem. Mater., 2002, pp. 1249-1256, vol. 14, No. 3, American Chemical Society, USA.

Xu, Xiangling et al., "Mesoscopic Monodisperse Ferromagnetic Colloids Enable Magnetically Controlled Photonic Crystals," J. Am. Chem. Soc., 2002, pp. 13864-13868, vol. 124, American Chemical Society, USA.

Zeng, Fang et al., "Urea sensing materials via solidified crystalline colloidal arrays," Sensors and Actuators B, 2002, pp. 273-276, vol. 81, Elsevier Science B.V.

Zeng, Fang et al., "Preparation and dynamic viscoelastic properties of strengthened solidified colloidal crystals," Reactive & Functional Polymers, 2002, pp. 39-44, vol. 53, Elsevier Science B.V.

Xu, Xiangling et al., "Superparamagnetic Photonic Crystals," Advanced Materials, Nov. 16, 2001, pp. 1681-1684, vol. 13, No. 22, Wiley-VCH Verlag GmbH, Weinheim, Germany.

Jethmalani, Jagdish M. et al., "Diffraction of Visible Light by Ordered Monodisperse Silica-Poly(methyl acrylate) Composite Films," Chem. Mater., 1996, pp. 2138-2146, vol. 8, American Chemical Society, USA.

Pfaff et al., "Angle-Dependent Optical Effects Deriving from Submicron Structures of Films and Pigments," Chemical Review 1999, Mar. 15, 1999, pp. 1963-1981, vol. 99, American Chemical Society.

Velev, O. D. et al., "Porous silica via colloidal crystallization," Nature, Oct. 2, 1997, pp. 447-448, vol. 389, Macmillan Publishers Ltd.

Sperling, L.H., et al., "Interpenetrating Polymer Networks," pp. 427-431.

Landec Intelligent Materials, "The Smart Polymer Solution", http://www.landec.com/technology.html, Mar. 5, 2010.

* cited by examiner

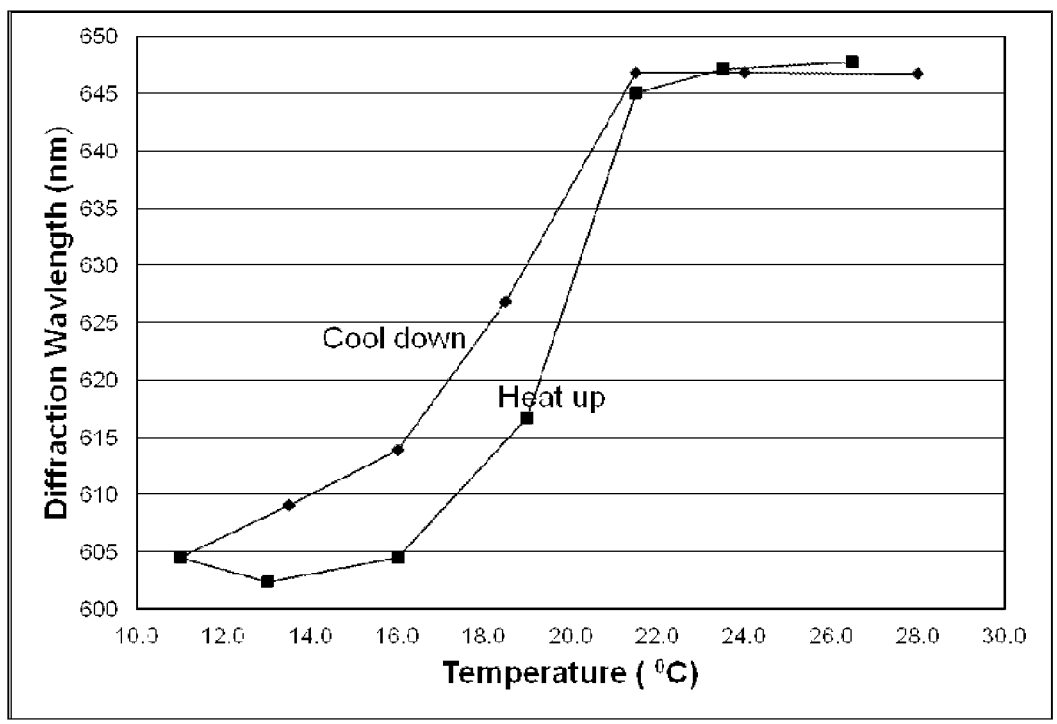

TEMPERATURE SENSITIVE COMPOSITE FOR PHOTONIC CRYSTALS

BACKGROUND OF THE INVENTION

1. Field of the Invention

This invention relates to thermally responsive crystals, more particularly to inverse opal photonic crystals containing material within the voids of the inverse opal that is responsive to temperature changes, thereby changing the band gap of radiation reflected by the photonic crystal.

2. Description of Related Art

Photonic crystals are optical materials in which the refractive index varies in multiple dimensions. Photonic crystals may be produced from crystalline colloidal arrays that reflect radiation according to Bragg's law over a range of wavelengths that depends on the composition of the materials in the array, the particle size, the packing arrangement within the array, and the degree of regularity of the array. Crystalline colloidal arrays have been used as three-dimensional ordered arrays of mono-dispersed colloidal particles that are often composed of a polymer latex such as polystyrene or an inorganic material such as silica. Colloidal dispersions of particles can form crystalline structures having lattice spacings that are comparable to the wavelength of radiation, within the ultraviolet, visible, or infrared wavelengths. Such crystalline structures have been used for filtering narrow bands from selected wavelengths from a broad spectrum of incident radiation, while permitting transmission of adjacent wavelengths of radiation.

Such crystalline colloidal arrays typically have a constant inter-particle spacing within the array, whereas other crystalline colloidal arrays may be thermally active when the inter-particle spacing varies in response to stimuli, such as temperature change. Thermally responsive crystalline colloidal arrays traditionally are produced from hydrogels. In hydrogel-based devices, mono-dispersed, highly-charged colloidal particles are dispersed in aqueous media. The particles self-assemble into a crystalline colloidal array due to the electrostatic charges. The ordered structure diffracts radiation according to Bragg's law, wherein the radiation meeting the Bragg condition is reflected while adjacent spectral regions that do not meet the Bragg conditions are transmitted through the device. An array of particles that diffract radiation according to Bragg's law satisfies the equation:

$$m\lambda = 2nd \sin \theta$$

where m is an integer, $\lambda$ is the wavelength of reflected radiation, n is the effective refractive index of the array, d is the distance between the layers of particles, and $\theta$ is the angle that the reflected radiation makes with a plane of a layer of the particles. Thus, by increasing particle size or the volume of the matrix between layers of particles, the interparticle distance (d) between the layers of particles increases, thereby changing the wavelength of diffracted radiation. The particle size and/or the matrix volume may increase in response to a stimulus, such as a temperature change that causes the particles or the matrix to swell. Likewise, a change in the effective refractive index of the array can also shift the wavelength of diffracted radiation.

Other photonic crystals are based on inverse opals. Synthetic opal structures have been produced from uniformly-sized submicron silica spheres that are arranged into an ordered periodic array. The voids between the silica spheres are filled with a matrix material followed by dissolution of the silica spheres to yield a periodic array of voids within the uniform matrix material. The voids may be filled with a filler composition in order to adjust the optical properties of the inverse opal.

SUMMARY OF THE INVENTION

The present invention includes a composite photonic crystal comprising an inverse opal structure defining an ordered array of voids and a filler composition received with the voids, wherein a property of the filler composition changes in response to a stimulus, thereby changing the band gap of radiation reflected by the composite photonic crystal. Also included in the present invention is a method of detecting a temperature change comprising providing a composite photonic crystal comprising an inverse opal structure defining an ordered array of voids and a filler composition received within the voids, wherein a property of the filler composition changes in response to temperature change; changing the temperature of the composite photonic crystal; and detecting a change in the photonic band gap of the composite photonic crystal. One method of making a temperature responsive composite photonic crystal includes producing an inverse opal defining a plurality of voids, filling the voids with a polymerizable filler composition, and polymerizing the filler composition, wherein a property of the filler composition changes in response to a change in temperature thereby changing the band gap of radiation reflected by the composite photonic crystal.

BRIEF DESCRIPTION OF THE DRAWING

FIG. 1 is a graph of the response of the diffraction peak of the material of the present invention to temperature change.

DESCRIPTION OF THE PREFERRED EMBODIMENTS

For purposes of the following detailed description, it is to be understood that the invention may assume various alternative variations and step sequences, except where expressly specified to the contrary. Moreover, other than in any operating examples or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is meant to include homopolymer, copolymer, and oligomer. The term "metal" includes metals, metal oxides, and metalloids. The term "infuse" and related terms (such as infusion) refer to penetration from a liquid phase.

Composite Photonic Crystal

The present invention includes temperature sensitive composite photonic crystals for controlling the wavelength of radiation that reaches a substrate. The material of the present invention diffracts radiation in the visible and/or non-visible electromagnetic spectrum and further includes methods for making the same. The present invention is described in reference to a diffraction wavelength or diffraction peak, which refers to a peak band of radiation reflected upon diffraction by the material of the present invention. Thus, "diffraction wavelength" refers to a band of radiation having wavelengths that generally satisfy Bragg's law. The reflected radiation may be in the visible spectrum or invisible spectrum (e.g., infrared or ultraviolet radiation).

The composite photonic crystal of the present invention includes an inverse opal structure that defines an ordered array of voids and a filler composition received within the voids. A property of the filler composition changes in response to a stimulus, such as a temperature change, thereby changing the band gap of radiation reflected by the composite photonic crystal. In one embodiment, the refractive index of the filler composition changes with a response to a stimulus, such as a change in temperature. As such, the effective refractive index of the composite photonic crystal changes. The change in the effective refractive index shifts the wavelength of diffraction ($\lambda$). This shift in wavelength of diffraction by the composite photonic crystal also affects the contrast associated with the composite photonic crystal as determined by the amount of radiation that is reflected thereby. Thus, with application of a stimulus, such as a temperature change, the photonic crystal will exhibit a change in the diffraction wavelength as well as a change in contrast.

Inverse opals used to produce a composite photonic crystal of the present invention may be produced according to conventional techniques. For example, a periodic array of particles may be produced and back filled with a matrix composition which is then fixed in place around the ordered array of particles. By fixing it is meant that the matrix material is cured or cross-linked or otherwise fixed surrounding the particles, creating a crystalline ordered array. The particles may be removed from the array by dissolving the particles in a solvent or by heating the material to degrade and volatilize the particles. For example, polystyrene particles or other polymer particles may be dissolved in a solvent, such as toluene, followed by heating to evaporate the toluene, thereby resulting in an inverse opal structure. The resulting inverse opal includes the fixed matrix material with a periodic array of voids therein. The present invention is not limited to the technique for producing such an inverse opal nor the materials of the particles which are removed in order to produce the inverse opal.

Suitable material for use as a filler composition for receiving into the voids of the inverse opal includes material having a property that changes with a stimulus. One non-limiting example of a stimulus is a change in temperature, where the temperature change causes a property of the filler material to change. In one embodiment, the conductivity of filler composition changes with temperature change. For example, a filler composition that exhibits a conductivity change in response to temperature change transitions between functioning as a conductor to functioning as an insulator (or the reverse) upon a change in temperature, such as vanadium dioxide or the like. A change in conductivity of the filler composition within the voids of the inverse opal changes the refractive index of the filler composition, thereby changing the difference in refractive index between the filled voids and the surrounding matrix of the inverse opal. A change in the refractive index difference between filled voids and matrix changes the contrast of the composite photonic crystal, which is detectable as a change in the amount of radiation reflected by the composite photonic crystal. For radiation reflected in the visible spectrum, a contrast change is detectable as an increase or decrease in brightness of the reflected radiation. Additionally, a change in refractive index of the filler composition also changes the effective refractive index of the composite photonic crystal, thereby shifting the wavelength of diffraction. As such, when a conductor-insulator material is used as the filler composition in the composite photonic crystal, a temperature change results in a contrast change and a shift in the diffraction wavelength.

In another embodiment, the filler composition comprises a polymeric composition that changes conformation with a temperature change. By conformation, it is meant the three-dimensional shape of the polymeric chains of the composition. One suitable polymeric material is a side chain crystalline polymer, such as acrylic materials having at least 8 carbon atoms, e.g., stearyl acrylate. In general, the volume of space occupied by a side chain crystalline polymer increases with increasing temperature as the side chains of the polymer relax at higher temperature, thereby expanding the conformation of the polymer to occupy a larger volume of space.

In one embodiment of the invention, a side chain crystalline polymer is produced in the voids in the inverse opal in situ. Monomeric precursors are filled into the voids and are polymerized within the voids, such as by ultraviolet (UV) curing to create a polymeric material that is retained within the void. Monomers that may be used to produce side chain crystalline polymers include myristyl (meth)acrylate, cetyl (meth)acrylate, stearyl (meth)acrylate, arachinyl (meth)acrylate, behenyl (meth)acrylate.

The composite photonic crystal of the present invention is particularly suited for filtering band gaps of radiation. For example, the photonic crystal of the present invention may be used to control infrared radiation that reaches a substrate. The infrared radiation in sunlight is responsible for heating surfaces of buildings, roads, and the like. The photonic crystal of the present invention may be tuned so that when the photonic crystal reaches a predetermined temperature, which is considered to be unacceptable for the underlying surface, the filler composition retained within the voids changes in a manner that causes a shift in the wavelength of diffraction, thereby reflecting a particular band gap, such as infrared radiation. A composite photonic crystal produced according to the present invention that reflects infrared radiation when the temperature reaches a predetermined level may be used to control the heating of a surface by sunlight. For example, the composite photonic crystal that reflects infrared radiation at elevated temperatures may be applied to surfaces of buildings or vehicles or other structures exposed to sunlight. When the surface of the structure reaches a predetermined temperature, the wavelength of diffraction of the composite photonic crystal thereon shifts so that infrared radiation is reflected. Upon cooling, the diffraction wavelength shifts back so that infrared radiation is no longer reflected. Alternatively, the band gap may be adjusted so that the infrared radiation that reaches a surface passes through the photonic crystal and is not reflected thereby in order to heat the underlying structure. By allowing infrared radiation to reach the underlying structure, the structure may heat up so as to prevent ice buildup on the surface during winter time. It should be appreciated that the filler composition received within the voids of the composite photonic crystal of the present invention may be adjusted so that the band gap of radiation that is reflected from the composite photonic crystal has the desired effect on the substrate bearing the composite photonic crystal, for example, reflecting infrared radiation or allowing infrared radiation to pass therethrough and reflecting of an alternate band gap, such as visible radiation.

As detailed below, the composite photonic crystal may be produced on a substrate that functions as a temporary support or on a substrate that is a desired end-use for the composite photonic crystal. By temporary support, it is meant that the substrate is used to support production of the composite photonic crystal of the present invention, which is subsequently removed therefrom in self-supporting form, such as, for example, a self-supporting film or comminuted particulate matter. A film of the composite photonic crystal or particulates of the composite photonic crystal may then be applied to another support or added to a composition (such as a coating composition) for its ultimate end-use. The end-use and final form of the thermally responsive material is not limited to those described herein.

Substrate

The substrate may be a flexible material, such as metal sheet or foil (e.g., aluminum foil), paper, or a film (or sheet) of polyester or polyethylene terephthalate (PET), or an inflexible material, such as glass or plastic. By "flexible" it is meant that the substrate can undergo mechanical stresses, such as bending, stretching, compression, and the like, without significant irreversible change. One suitable substrate is a microporous sheet. Some examples of microporous sheets are disclosed in U.S. Pat. Nos. 4,833,172; 4,861,644; and 6,114,023, which are incorporated herein by reference. Commercially available microporous sheets are sold under the designation Teslin® by PPG Industries, Inc. Other suitable flexible substrates include natural leather, synthetic leather, finished natural leather, finished synthetic leather, suede, vinyl nylon, ethylene vinyl acetate foam (EVA foam), thermoplastic urethane (TPU), fluid-filled bladders, polyolefins and polyolefin blends, polyvinyl acetate and copolymers, polyvinyl chloride and copolymers, urethane elastomers, synthetic textiles, and natural textiles.

In certain embodiments, the flexible substrates are compressible substrates. "Compressible substrate" and like terms refer to substrates capable of undergoing a compressive deformation and returning to substantially the same shape once the compressive deformation has ceased. The term "compressive deformation" means a mechanical stress that reduces the volume at least temporarily of a substrate in at least one direction. A compressible substrate is one, for example, that has a compressive strain of 50% or greater, such as 70%, 75%, or 80% or greater. Particular examples of compressible substrates include those comprising foam and polymeric bladders filled with air, liquid, and/or plasma. "Foam" can be a polymeric or natural material comprising open cell foam and/or closed cell foam. "Open cell foam" means that the foam comprises a plurality of interconnected air chambers; "closed cell foam" means that the foam comprises discrete closed pores. Example foams include, but are not limited to, polystyrene foams, polyvinyl acetate and/or copolymers, polyvinyl chloride and/or copolymers, poly (meth)acrylimide foams, polyvinylchloride foams, polyurethane foams, thermoplastic urethane foams, polyolefinic foams, and polyolefin blends. Polyolefinic foams include, but are not limited to, polypropylene foams, polyethylene foams, and ethylene vinyl acetate (EVA) foams. "EVA foam" can comprise open cell foam and/or closed cell foam. EVA foam can include flat sheets or slabs or molded EVA foams, such as shoe midsoles. Different types of EVA foam can have different types of surface porosity. Molded EVA foam can comprise a dense surface or skin, whereas flat sheets or slabs can exhibit a porous surface.

Polyurethane substrates according to the present invention include aromatic, aliphatic, and hybrid (hybrid examples are silicone polyether or polyester urethane and silicone carbonate urethane) polyester or polyether-based thermoplastic urethane. By "plastic" is meant any of the common thermoplastic or thermosetting synthetic materials, including thermoplastic olefins (TPO) such as polyethylene and polypropylene and blends thereof, thermoplastic urethane, polycarbonate, sheet molding compound, reaction-injection molding compound, acrylonitrile-based materials, nylon, and the like. A particular plastic is a TPO that comprises polypropylene and EPDM (ethylene propylene diene monomer).

The composite photonic crystal may be applied to an article in various ways. In one embodiment, the material is produced on a substrate and is then removed from the substrate as a self-supporting film or is comminuted into particulate form, such as in the form of flakes. The comminuted composite photonic crystal may be incorporated as an additive in a coating composition for applying to an article. It may be beneficial to minimize the haze in a coating composition containing the comminuted composite photonic crystal. Reduced haze may be achieved by reducing the difference in refractive index between the matrix and particles of the composite material. However, a reduction in the refractive index difference generally reduces the intensity of refracted radiation. Therefore, when minimal haze is desired and the refractive index difference is reduced, intensity may be maintained by increasing the thickness of the composite photonic crystal, i.e., by increasing the quantity of layers of particles in the material, as compared to material in which the refractive indices of the matrix and particles are more distinct from each other.

In one embodiment, the coating composition comprises a "hard coat," such as an alkoxide. The alkoxide can be further mixed and/or reacted with other compounds and/or polymers known in the art. Particularly suitable are compositions comprising siloxanes formed from at least partially hydrolyzing an organoalkoxysilane, such as one within the formula above. Examples of suitable alkoxide-containing compounds and methods for making them are described in U.S. Pat. Nos. 6,355,189; 6,264,859; 6,469,119; 6,180,248; 5,916,686; 5,401,579; 4,799,963; 5,344,712; 4,731,264; 4,753,827; 4,754,012; 4,814,017; 5,115,023; 5,035,745; 5,231,156; 5,199,979; and 6,106,605, which are incorporated by reference herein.

In certain embodiments, the alkoxide comprises a combination of a glycidoxy[($C_1$-$C_3$)alkyl]tri($C_1$-$C_4$)alkoxysilane monomer and a tetra($C_1$-$C_6$)alkoxysilane monomer. Glycidoxy[($C_1$-$C_3$)alkyl]tri($C_1$-$C_4$)alkoxysilane monomers suitable for use in the coating compositions of the present invention include glycidoxymethyltriethoxysilane, α-glycidoxyethyltrimethoxysilane, α-glycidoxyethyl-triethoxysilane, β-glycidoxyethyltrimethoxysilane, β-glycidoxyethyltriethoxysilane, α-glycidoxy-propyltrimethoxysilane, α-glycidoxypropyltriethoxysilane, β-glycidoxypropyltrimethoxysilane, β-glycidoxypropyl-triethoxysilane, γ-glycidoxypropyltrimethoxysilane, hydrolysates thereof, and/or mixtures of such silane monomers. Suitable tetra($C_1$-$C_6$)alkoxysilanes that may be used in combination with the glycidoxy[($C_1$-$C_3$)alkyl]tri($C_1$-$C_4$)alkoxysilane in the coating compositions of the present invention include, for example, materials such as tetramethoxysilane, tetraethoxysilane, tetrapropoxysilane, tetrabutoxysilane, tetrapentyloxysilane, tetrahexyloxysilane, and mixtures thereof.

In certain embodiments, the glycidoxy[($C_1$-$C_3$)alkyl]tri($C_1$-$C_4$)alkoxysilane and tetra($C_1$-$C_6$)alkoxysilane monomers used in the coating compositions of the present invention are present in a weight ratio of glycidoxy[($C_1$-$C_3$)alkyl]tri($C_1$-$C_4$)alkoxysilane to tetra($C_1$-$C_6$)alkoxysilane of from 0.5:1 to 100:1, such as 0.75:1 to 50:1 and, in some cases, from 1:1 to 5:1. In certain embodiments, the alkoxide is at least partially hydrolyzed before it is combined with other components of the coating composition, such as polymer-enclosed color-imparting particles. Such a hydrolysis reaction is described in U.S. Pat. No. 6,355,189 at column 3, lines 7 to 28, the cited portion of which is incorporated by reference herein. In certain embodiments, water is provided in an amount necessary for the hydrolysis of the hydrolyzable alkoxide(s). For example, in certain embodiments, water is present in an amount of at least 1.5 moles of water per mole of hydrolyzable alkoxide. In certain embodiments, atmospheric moisture, if sufficient, can be adequate.

In certain embodiments, a catalyst is provided to catalyze the hydrolysis and condensation reaction. In certain embodiments, the catalyst is an acidic material and/or a material different from the acidic material which generates an acid upon exposure to actinic radiation. In certain embodiments, the acidic material is chosen from an organic acid, inorganic acid, or mixture thereof. Non-limiting examples of such materials include acetic, formic, glutaric, maleic, nitric, hydrochloric, phosphoric, hydrofluoric, sulfuric acid, or mixtures thereof.

Any material that generates an acid on exposure to actinic radiation can be used as a hydrolysis and condensation catalyst in the coating compositions of the present invention, such as a Lewis acid and/or a Bronsted acid. Non-limiting examples of acid-generating compounds include onium salts and iodosyl salts, aromatic diazonium salts, metallocenium salts, o-nitrobenzaldehyde, the polyoxymethylene polymers described in U.S. Pat. No. 3,991,033, the o-nitrocarbinol esters described in U.S. Pat. No. 3,849,137, the o-nitrophenyl acetals, their polyesters, and end-capped derivatives described in U.S. Pat. No. 4,086,210, sulphonate esters, or aromatic alcohols containing a carbonyl group in a position alpha or beta to the sulphonate ester group, N-sulphonyloxy derivatives of an aromatic amide or imide, aromatic oxime sulphonates, quinone diazides, and resins containing benzoin groups in the chain, such as those described in U.S. Pat. No. 4,368,253. Examples of these radiation activated acid catalysts are also disclosed in U.S. Pat. No. 5,451,345.

In certain embodiments, the acid-generating compound is a cationic photoinitiator, such as an onium salt. Non-limiting examples of such materials include diaryliodonium salts and triarylsulfonium salts, which are commercially available as SarCat® CD-1012 and CD-1011 from Sartomer Company. Other suitable onium salts are described in U.S. Pat. No. 5,639,802, column 8, line 59 to column 10, line 46. Examples of such onium salts include 4,4'-dimethyldiphenyliodonium tetrafluoroborate, phenyl-4-octyloxyphenyl phenyliodonium hexafluoroantimonate, dodecyldiphenyl iodonium hexafluoroantimonate, [4-[(2-tetradecanol)oxy]phenyl]phenyl iodonium hexafluoroantimonate, and mixtures thereof.

The amount of catalyst used in the coating compositions of the present invention can vary widely and depend on the particular materials used. Only the amount required to catalyze and/or to initiate the hydrolysis and condensation reaction is required, e.g., a catalyzing amount. In certain embodiments, the acidic material and/or acid-generating material can be used in an amount from 0.01 to 5% by weight, based on the total weight of the composition.

The composite photonic crystal of the present invention also may be used in marking devices, including documents of value, articles of manufacture and their packaging, and credentials documents, particularly of an anti-counterfeiting device. Examples of documents of value include currency, credit cards, compliance certificates, collectors' items and trading cards, deeds, titles or registrations (e.g., automotive), compliance decals, tickets (e.g., travel, events or parking), tax stamps, coins, postage stamps, checks and money orders, stationery, lottery tickets, chips and/or tokens, controlled items (e.g., evidence), key cards, keys, tracing and tracking items, and as a portion of a barcode. Articles of manufacture or packaging of articles of manufacture may include aircraft parts, automotive parts, such as vehicle identification numbers, pharmaceutical products and personal care products, recorded media, clothing and footwear, electronic devices, batteries, ophthalmic devices, alcohol, food items, printing inks and printing consumables, writing implements, luxury items, such as luggage and handbags, sporting goods, software and software packaging, tamper seals, artwork (including original works of art), construction materials, munitions, toys, fuel, industrial equipment, biological materials and living goods, jewelry, books, antiques, safety items (e.g., fire extinguishers and filtration devices), carpets and other furnishings, chemicals, medical devices, paint and coatings, and windows and transparencies. Examples of credentials which may bear the composite photonic crystal of the present invention include drivers' licenses, identification cards (government, corporate, and educational) passports, visas, marriage certificates, hospital bracelets, and diplomas. These examples are not meant to be limiting and are only a sampling of devices that may bear the composite photonic crystal of the present invention. Such uses are not meant to be limiting.

In addition, the composite photonic crystal may be produced in the form of a film, which is then applied to an article, such as via an adhesive or the like.

Alternatively, the article itself may serve as a substrate by applying the composite photonic crystal directly to the housing of the article, such as the housing of electronic devices or directly to goods such as athletic equipment, accessories, optical lenses, optical frames, clothing, including shoes and the like.

The composite photonic crystal of the present invention may be used to authenticate an article, such as to authenticate a document or device or to identify the source of a manufactured product. A document, such as a security card, that bears the composite photonic crystal of the present invention would be considered to be authentic if the article bearing the thermally responsive material exhibits the properties thereof, such as responsiveness to temperature change. A "security card" includes documents or devices that authenticate the identity of the bearer thereof or permit access to a facility, such as in the form of a badge. The security card may identify the bearer of the card (e.g., a photo-identification card or a passport) or may function as a document or device that indicates that the bearer thereof is to be permitted access to a secure facility. For example, a security card that appears to be authentic may be tested for having properties of diffracting a particular wavelength of radiation at a particular temperature. A counterfeit security card would fail to exhibit that property. Likewise, consumers of an item (such as a pharmaceutical product) provided in packaging bearing the thermally switchable material of the present invention can test the packaging for its authenticity by testing the response of its thermally responsive properties to temperature changes. Packaging which does not respond appropriately would be considered to be counterfeit, while packaging that does exhibit the property would be considered to be authentic. Other consumer goods may include composite photonic crystal of the present invention, such as on the housing of a manufactured product (e.g., electronic devices) or on the surface of an article of clothing (e.g., shoes). These examples of articles for authentication and the temperature response by the material of the present invention applied thereto are not meant to be limiting. Articles for authentication could include composite photonic crystal exhibiting a temperature response, which may be used as an indicator of the authenticity of the article.

The composite photonic crystal may further be at least partially covered with a coating composition in a multi-layered structure. In one embodiment, the composite photonic crystal is coated with the above-described "hard coat" coating composition. In another embodiment, the composite photonic crystal is coated with an anti-reflective coating, such as in a multi-layered, anti-reflective stack. The anti-reflective coating may be formed of a dielectric material, e.g., metal oxides, such as $Zn_2SnO_4$, $In_2SO_4$, $SnO_2$, $TiO_2$, $In_2O_3$, $ZnO$, $Si_3N_4$, and/or $Bi_2O_3$ deposited by sputtering.

The following examples are presented to demonstrate the general principles of the invention. The invention should not be considered as limited to the specific examples presented. All parts are by weight unless otherwise indicated.

EXAMPLES

Example 1

A dispersion of polystyrene particles in water was prepared via the following procedure. 2.5 Grams (g) of sodium bicarbonate from Aldrich Chemical Company, Inc., was mixed with 2250 g deionized (DI) water and 150 g ethylene glycol available from Aldrich Chemical Company, Inc., and added to a 5-liter reaction kettle equipped with a thermocouple, heating mantle, stirrer, reflux condenser and nitrogen inlet. The mixture was sparged with nitrogen for 43 minutes with stirring and then blanketed with nitrogen. 10.5 Grams of Aerosol MA80-I from Cytec Industries, Inc., and 4.0 g Brij 35 (polyoxyethylene(23) lauryl ether) from the Aldrich Chemical Company, Inc., 1.0 g sodium styrene sulfonate (SSS) from Aldrich Chemical Company, Inc in 25 g DI water were added to the mixture with stirring. The mixture was heated to approximately 50° C. using a heating mantle. Styrene monomer (520 g) available from Aldrich Chemical Company, Inc., was added to the reaction kettle with stirring. The mixture was heated to 65° C. Sodium persulfate from the Aldrich Chemical Company, Inc. (6.25 g in 72 g DI water) was added to the mixture with stirring. Under agitation, the temperature was held at approximately 65° C. for 6 hours. A mixture of DI water (450 g), Brij 35 (1.5 g), sodium persulfate (1.5 g), styrene (100 g), methyl methacrylate (100 g), and sodium styrene sulfonate (1.6 g) all available from Aldrich Chemical Company, Inc., was added to the reaction mixture with stirring. The temperature of the mixture was maintained at 65° C. for approximately an additional 2 hours. The resulting polymer dispersion was filtered through a one-micron filter bag. The polymer dispersion was then ultrafiltered using a 4-inch ultrafiltration housing with a 2.41-inch polyvinylidine fluoride membrane, both from PTI Advanced Filtration, Inc. Oxnard, Calif., and pumped using a peristaltic pump at a flow rate of approximately 170 ml per second. DI water (2985 g) was added to the dispersion after 3000 g of ultrafiltrate had been removed. This exchange was repeated several times until 11349 g of ultrafiltrate had been replaced with 11348 g DI water. Additional ultrafiltrate was then removed until the solids content of the mixture was 44.8 percent by weight. The material was applied via a slot-die coater from Frontier Industrial Technology, Inc., Towanda, Pa. to a 2 mil thick polyethylene terephthalate (PET) substrate and dried at 180° F. for 40 seconds to a dry thickness of approximately 10 microns. The resulting material diffracted light at 657 nm measured with a Cary 500 spectrophotometer from Varian, Inc.

Example 2

An ultraviolet radiation curable organic composition was prepared via the following procedure. Diphenyl(2,4,6-trimethylbenzoyl)phosphineoxide/2-hydroxy-2-methyl-propiophenone (0.05 g), was mixed with 2 g CN4000, an aliphatic methane acrylate from Sartomer Company, Inc., Exton, Pa. This UV curable composition was then applied to the material from Example 1 using a drawdown bar. The coated material was covered with a piece of 1 mil thick PET film (coversheet) before UV curing with a 100 W mercury lamp for 30 seconds. The resulting film was immersed in toluene for 24 hours to remove the polystyrene particles and then dried at room temperature to generate an inverse opal structure with a periodic array of voids in a cured matrix.

The voids in the inverse opal were infiltrated with a mixture of diphenyl(2,4,6-trimethylbenzoyl)phosphine oxide/2-hydroxy-2-methyl-propiophenone (0.05 g), stearyl acrylate (2 g SR257) and polyethylene glycol (400) dimethacrylate (0.04 g, SR603) both from Sartomer Company, Inc., Exton, Pa. The filled inverse opal was UV cured with a 100 W mercury lamp for 30 seconds. The temperature response of diffraction of the resulting film is shown in FIG. 1. When the temperature changed from 10° C. to 30° C., the diffraction wavelength red-shifted from 604 nm to 647 nm. Upon cooling, the diffraction wavelength reversibly returned to 604 nm.

While the preferred embodiments of the present invention are described above, obvious modifications and alterations of the present invention may be made without departing from the spirit and scope of the present invention. The scope of the present invention is defined in the appended claims and equivalents thereto.

The invention claimed is:

1. A composite photonic crystal comprising:
   (i) an inverse opal structure defining an ordered array of voids; and
   (ii) a filler composition received within the voids, wherein a property of the filler composition changes in response to a stimulus, thereby changing the band gap of radiation reflected by the composite photonic crystal,
   wherein the filler composition is responsive to a change in temperature, and wherein the filler composition comprises a side chain crystalline polymer.

2. The composite photonic crystal of claim 1, wherein the filler composition undergoes a phase change in response to a change in temperature.

3. The composite photonic crystal of claim 1, wherein the side chain crystalline polymer comprises an acrylic polymer having linear alkyl side chains of at least 8 carbon atoms.

4. The composite photonic crystal of claim 1, wherein the filler composition changes conductivity in response to a change in temperature.

5. The composite photonic crystal of claim 1, wherein a difference in refractive index between the inverse opal structure and the filler composition changes in response to a change in temperature.

6. The composite photonic crystal of claim 1, wherein the filler composition expands in response to a change in temperature.

7. A method of detecting a temperature change comprising:
providing a composite photonic crystal comprising: (i) an inverse opal structure defining an ordered array of voids; and (ii) a filler composition received within the voids, wherein a property of the filler composition changes in response to temperature change, and wherein the filler composition comprises a side chain crystalline polymer;
changing the temperature of the composite photonic crystal; and
detecting a change in the photonic band gap of the composite photonic crystal.

8. The method of claim 7, wherein the filler composition undergoes a phase change in response to changing the temperature of the composite photonic crystal.

9. The method of claim 7, wherein the detected change is a change in intensity of radiation reflected by the composite photonic crystal.

10. The method of claim 7, wherein the detected change is a change in the wavelength of radiation reflected by the composite photonic crystal.

11. A method of controlling the wavelength of radiation reflected by a surface comprising:
applying the composite photonic crystal of claim 1 to at least a portion of a surface of a substrate;
exposing the substrate surface bearing the composite photonic crystal to radiation at an exposure temperature, such that the composite photonic crystal reflects a wavelength band of radiation at the exposure temperature.

12. The method of claim 11, wherein the reflected wavelength band comprises infrared radiation.

13. The method of claim 11, wherein the reflected wavelength band comprises visible radiation.

14. A method of making a temperature responsive composite photonic crystal comprising:
producing an inverse opal defining an ordered array of voids;
filling the voids with a polymerizable filler composition; and
polymerizing the filler composition, wherein a property of the filler composition changes in response to a change in temperature thereby changing the band gap of radiation reflected by the composite photonic crystal, and wherein the filler composition comprises a side chain crystalline polymer.

15. The method of claim 14, wherein the polymerized filler composition undergoes a phase change in response to a change in temperature.

16. The method of claim 14, wherein the polymerizable filler composition is UV curable.

\* \* \* \* \*